March 17, 1936. F. M. McLAUGHLIN ET AL 2,034,662
TIRE TRIMMING MACHINE
Filed Dec. 4, 1934 6 Sheets-Sheet 2

INVENTORS
Francis M. M°Laughlin
Ray D. Hulslander
BY
Albert L. Ely
ATTORNEY

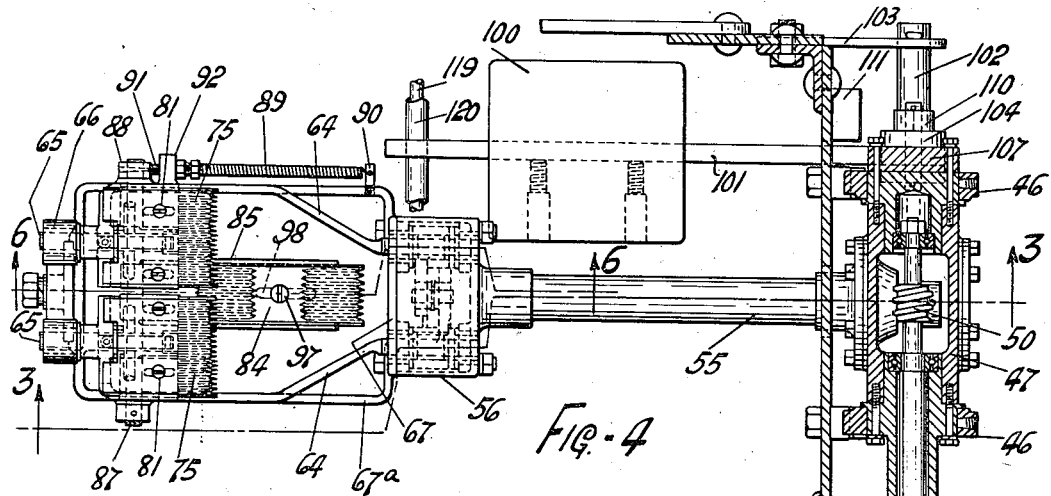

INVENTORS
FRANCIS M. McLAUGHLIN
RAY D. HULSLANDER
BY Albert L. Ely
ATTORNEY

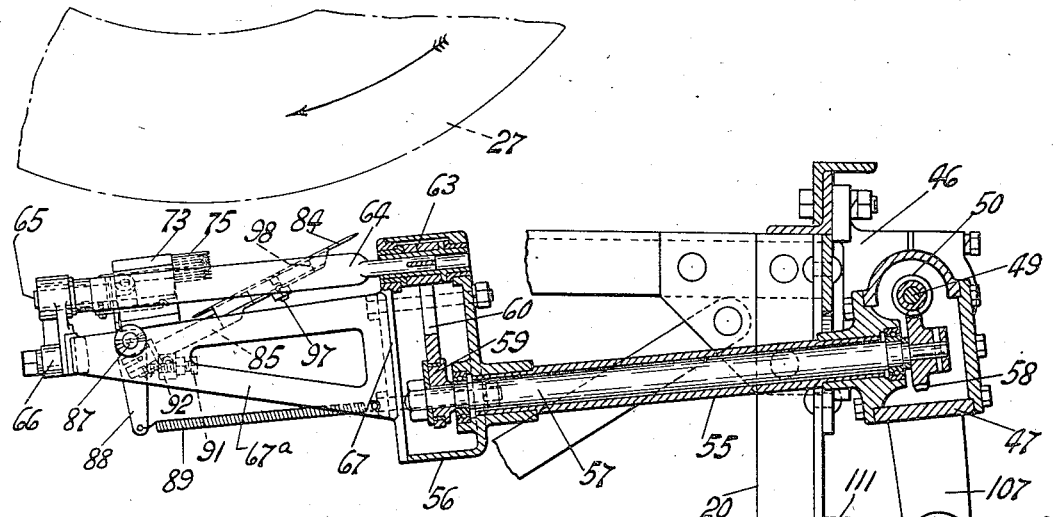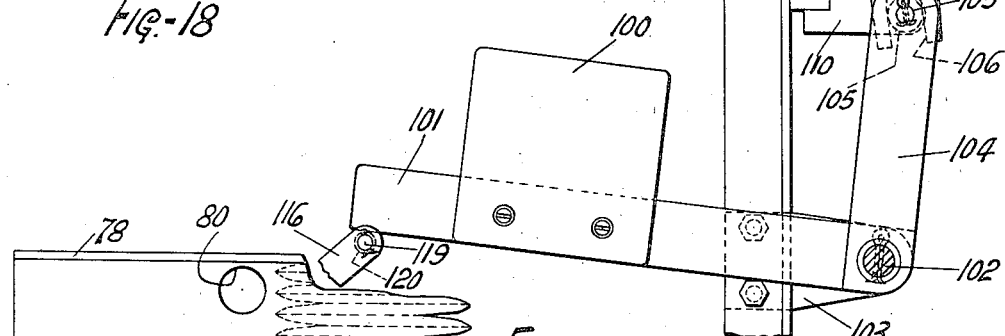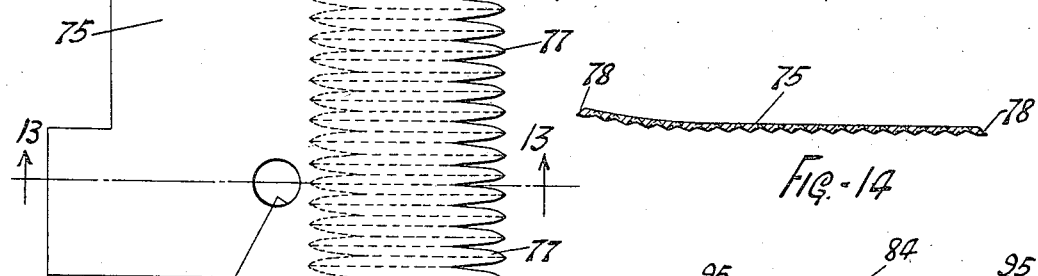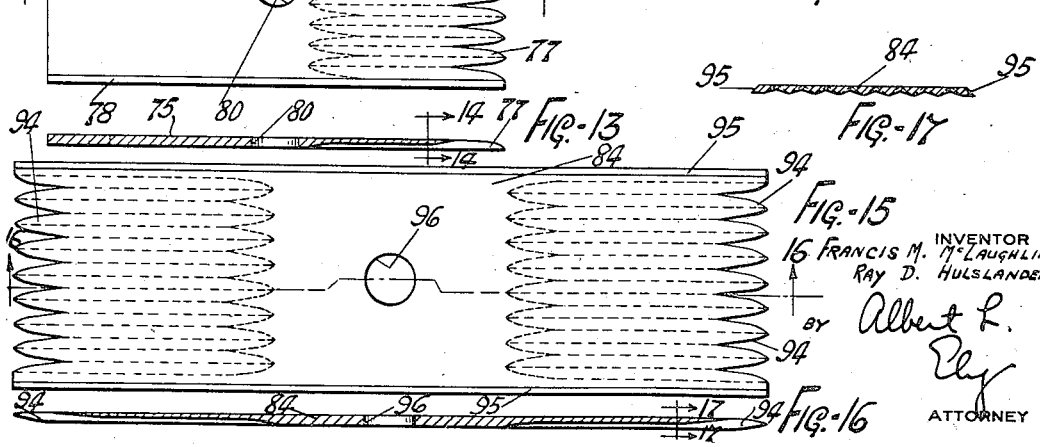

Patented Mar. 17, 1936

2,034,662

UNITED STATES PATENT OFFICE 2,034,662

TIRE TRIMMING MACHINE

Francis M. McLaughlin and Ray D. Hulslander, Akron, Ohio, assignors to The Firestone Tire & Rubber Company, Akron, Ohio, a corporation of Ohio Application December 4, 1934, Serial No. 755,914

12 Claims. (Cl. 164—48)

This invention relates to tire trimming machines, and more especially it relates to machines for removing from vulcanized rubber tires the circumferential overflow rands, and the small protuberances formed where rubber has flowed into the vent holes of the tire vulcanizing mold.

The chief objects of the invention are quickly and neatly to remove the overflow rand and other protuberances from the surface of a vulcanized tire; and to provide apparatus that automatically accomplishes the foregoing result. Other objects will be manifest.

In general, the apparatus embodying this invention includes means for peripherally driving a tire, and means disposed locally of the circumference of the tire for progressively removing overflow therefrom as the tire rotates. To utilize the machine to the fullest extent, manual operations may be performed upon the rotating tire as it is being trimmed, and to this end the machine is provided with suitable receptacles for sponges and washing fluid so that a tire being trimmed may be washed at the same time.

Of the accompanying drawings;

Figure 3 is a detail sectional view, on a larger scale, of the tire trimming mechanism of the apparatus in operative position, taken on the line 3—3 of Figure 4;

Figure 4 is a section on the line 4—4 of Figure 3;

Figure 5 is a section, on a larger scale, on the line 5—5 of Figure 3;

Figure 12 is a plan view, on a larger scale, of one of a pair of identical cutting elements of the apparatus;

Figure 13 is a section on the line 13—13 of Figure 12;

Figure 14 is a section on the line 14—14 of Figure 13;

Figure 15 is a plan view of a third cutting element of the apparatus;

Figure 16 is a section on the line 16—16 of Figure 15;

Figure 17 is a section on the line 17—17 of Figure 16; and

Figure 18 is a view of the parts shown in Figure 3 locked in inoperative position.

Figure 1:
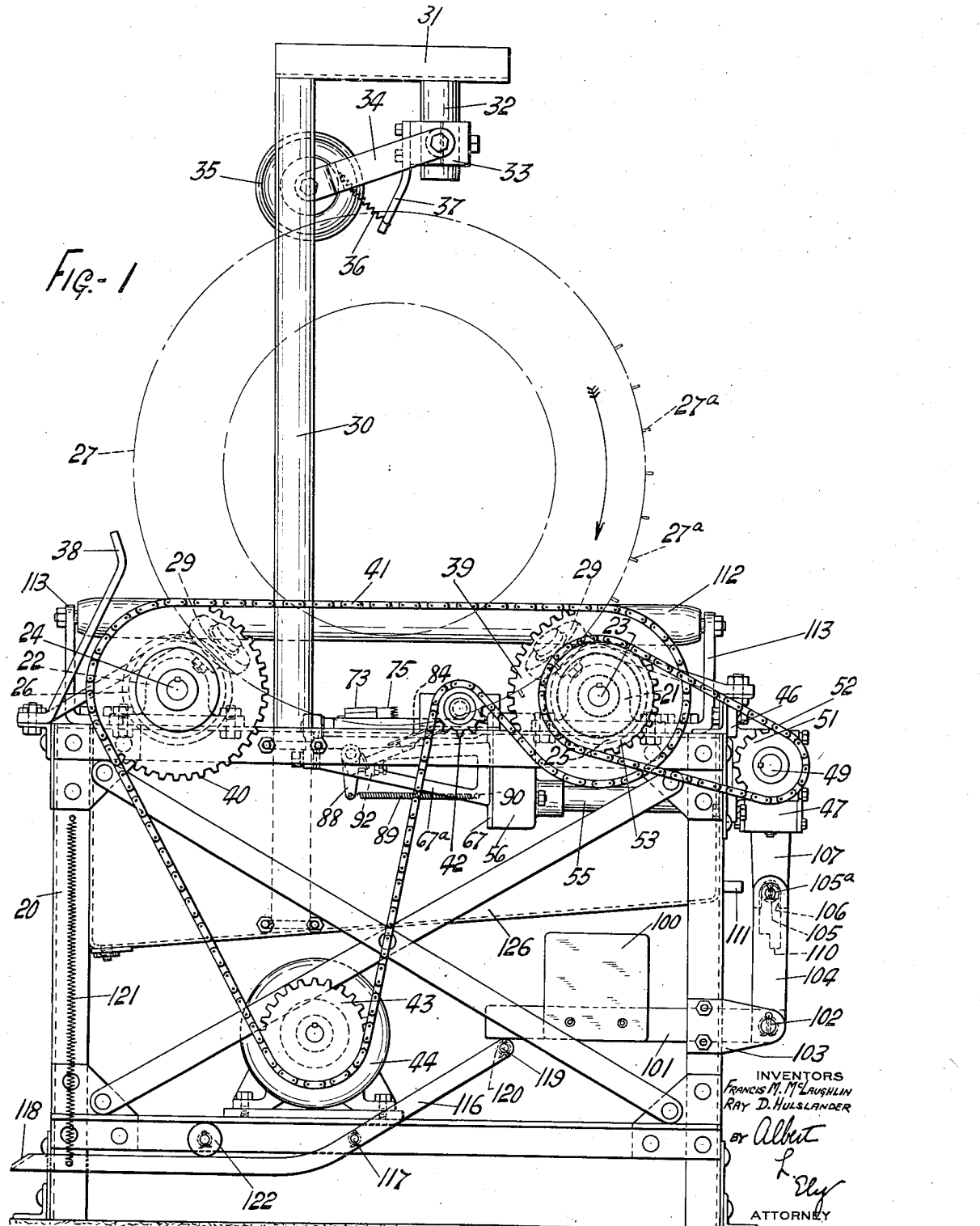
Figure 1 is a front elevation of apparatus embodying the invention in its preferred form, in operative position, receptacles for sponges and cleaning fluid being omitted for clearness of illustration.

Referring to the drawings, the machine comprises an open framework 20 upon the top of which are carried two pairs of bearing brackets 21, 21 and 22, 22 in which bearings are journaled shafts 23 and 24 respectively. Mounted upon the shafts 23, 24, centrally thereof between said brackets, are respective driving rollers 25, 26, each of which rollers is centrally grooved as is most clearly shown in Figure 2, and has the portions at opposite sides of said groove knurled and oppositely tapered toward the groove. The rollers 25, 26 support and peripherally drive the work, shown as a pneumatic tire casing 27, in the direction indicated by the arrow in Figure 1.

For retaining the work 27 in a vertical plane as it is driven by the rollers 25, 26, there are provided a plurality of guide rollers 29, 29 that are arranged in pairs on opposite sides of the said drive rollers, said guide rollers being obliquely disposed and adapted to engage the respective side walls of the tire 27. Rising from the front side of the framework 20 is a post 30 to the top of which is secured an overhanging arm 31 that carries a short, downwardly extending post 32 near its free end. Adjustably mounted on post 32 is a bracket 33 that carries an angular, pivotally mounted arm 34 that has a waisted roller 35 journaled on one side of its free end. The arm 34 normally is urged downwardly toward vertical position by a tension spring 36 connected to said arm and to a bar 37 projecting downwardly from bracket 33, said bar providing a stop against which said arm normally rests. The roller 35 is positioned in the same vertical plane as the drive rollers 25, 26.

The tire 27 is mounted in the machine from the right hand side thereof as viewed in Figure 1, said tire being placed first on roller 25 and then allowed to roll toward the left onto roller 26. A stationary abutment 38 is provided at the left side of the machine to prevent the tire from rolling beyond roller 26. In the mounting of the tire as described, the top of the tire engages roller 35 and moves it to the position shown in Figure 1. The arrangement is such that the roller 35 assists in retaining the tire in upright position, and yieldingly urges it into good frictional engagement with the drive rollers 25, 26.

Figure 6:
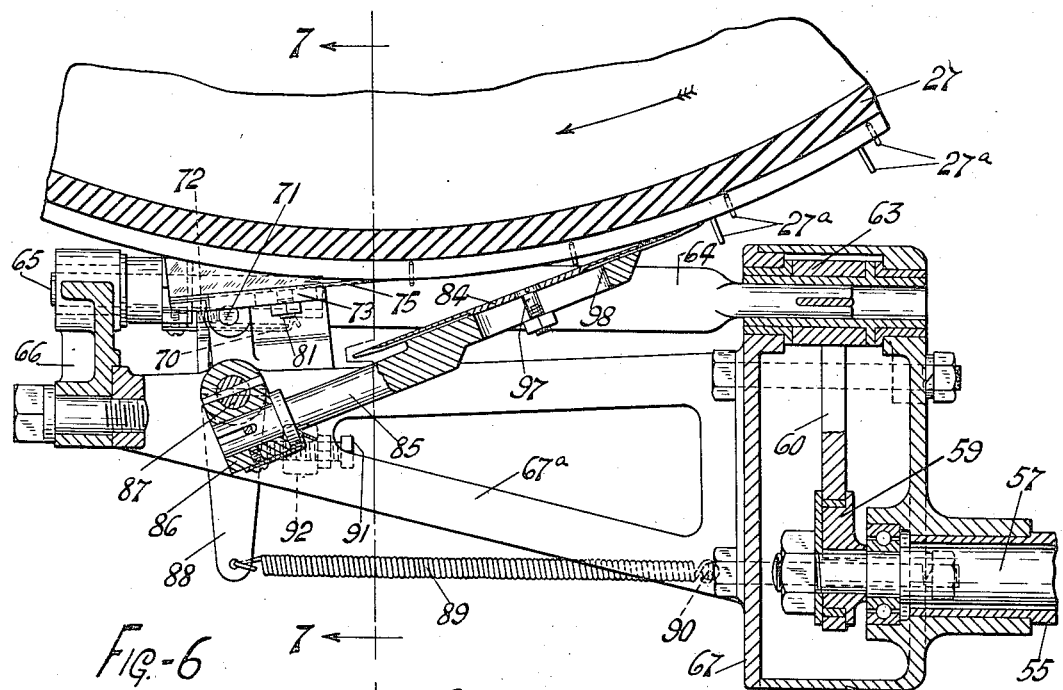
Figure 6 is a section, on a larger scale, on the lines 6—6 of Figure 4 and Figure 7.

For driving rollers 25, 26, the shafts 23, 24 thereof have their adjacent ends, at the front of the machine, provided with respective sprockets 39, 40 about which is trained a sprocket chain 41. The latter also passes about an adjustable idler sprocket 42, and about a driving sprocket 43 that is mounted upon the shaft of a motor 44, which motor is mounted in the lower part of framework 20. The arrangement is such that the motor 44 rotates the tire 27 about its own axis in the direction indicated by the arrow in Figure 1. As shown in Figures 1, 3 and 6, the tire 27 is formed in its tread portion with a multiplicity of radial protuberances 27a, 27a which are trimmed from the tire in this machine. Also any overflow rand (not shown) that may be formed on the perimeter of the tire will be trimmed therefrom concurrently with the removal of the protuberances 27a.

The mechanism for trimming the tire 27 comprises a pair of spaced apart bearing brackets 46, 46 that are mounted on the end of the framework 20 at the work-receiving end thereof, and journaled in said bearing brackets is a gear housing 47 that has a tubular, axial, extension 48 projecting toward the front of the machine. Journaled in the housing 47 and its extension 48 is a shaft 49 that carries a worm 50 that is disposed within housing 47. The outer end of shaft 49, at the front of the machine, carries a sprocket 51 that is connected by a sprocket chain 52 with a sprocket 53 that is mounted on the end of shaft 23. The arrangement is such that shaft 49 is driven by the motor 44.

Figure 10:
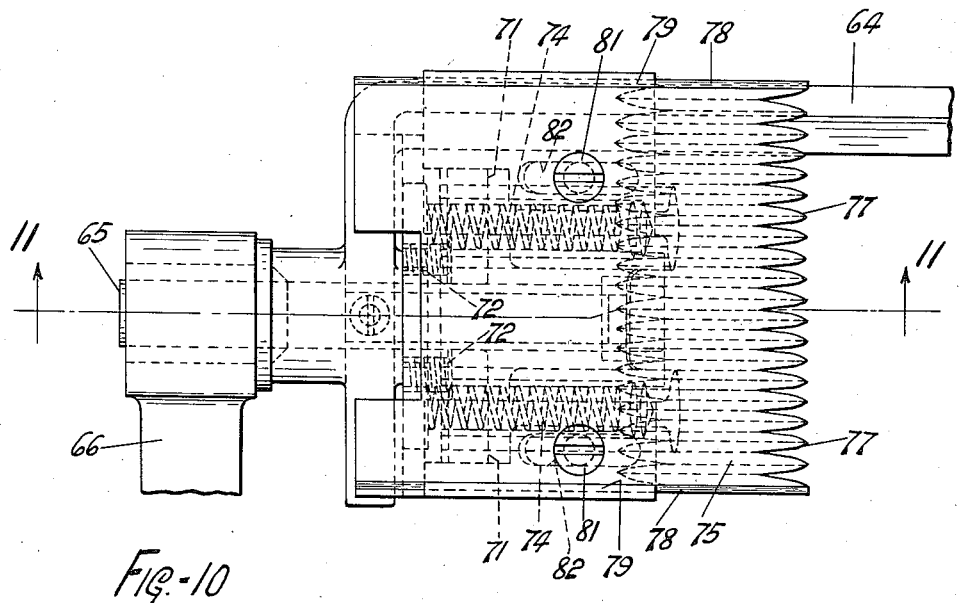
Figure 10 is a plan view, on a larger scale, of a portion of the trimming mechanism shown in Figure 4.
Figure 11:
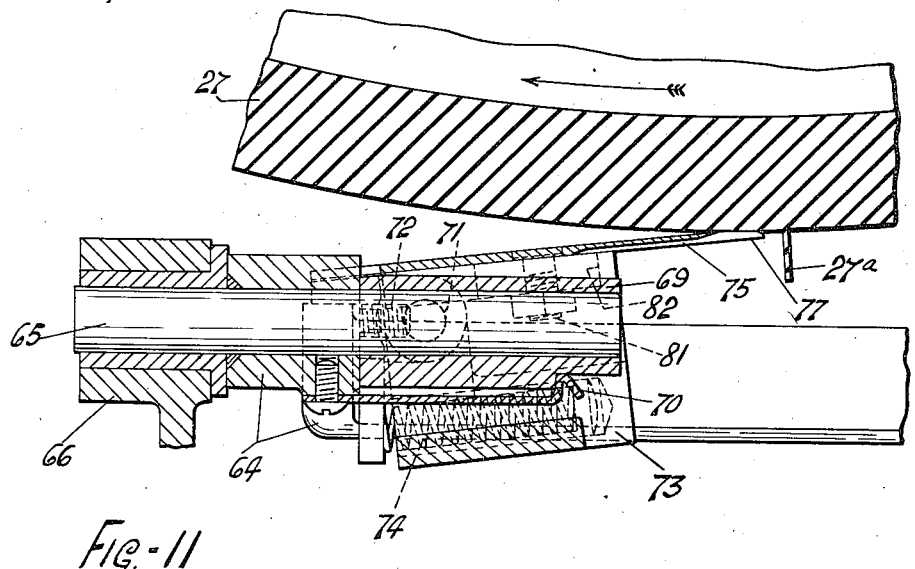
Figure 11 is a section on the line 11—11 of Figure 10.

Carried by the gear housing 47, and extending laterally thereof at right angles to its axis is a tubular arm 55, said arm being disposed in the same vertical plane as the tire 27, below the latter, and carrying a housing 56 that is mounted upon its free end. Extending through the tubular arm 55 is a shaft 57 that is suitably journaled at its respective end portions in housings 47 and 56. One end of shaft 57 carries a worm gear 58 that is meshed with worm 50, and the other end of said shaft carries an eccentric 59 within housing 56. Mounted upon eccentric 59 is an upwardly extending connecting rod 60 that has its upper end provided with a pin 61 that projects laterally from each side thereof and engages in respective aligned slots, such as the slot 62, Figure 5, formed in the free ends of a pair of opposed levers 63, 63. The latter are mounted upon the adjacent ends of a pair of knife shafts 64, 64, which shaft-ends are journaled in the housing 56. The knife shafts 64 have their opposite ends disposed exteriorly of the housing at some distance therefrom, and each carries a stub shaft 65 that is journaled in an arm of a two-arm bracket 66, the latter being carried upon the outer end of a rectangular, bracket-like structure 67a formed on the outer face of the cover 67 of housing 56. Between their end portions the knife shafts 64 are outwardly bowed as is most clearly shown in Figures 4 and 10. The arrangement is such that eccentric 59 continuously oscillates the knife shafts 64 upon their axes, through an angle indicated by the full line and broken line positions of the levers 63 in Figure 5.

The respective stub shafts 65 extend both ways from their mountings in the end portions of the knife shafts 64, and upon their projecting inner end portions they carry respective swivel blocks 69 which are retained thereon by spring clips 70 secured to the respective knife shafts 64. Projecting laterally from each side of each swivel block 69 are aligned swivel pins 71, 71 that are retained in place by respective set screws 72, and swiveled upon each pair of pins 71 is a knife holder 73. A pair of compression springs 74, 74 are mounted between each swivel block 69 and knife holder 73 in position to urge the free end of the knife holder upwardly. Mounted upon the upper face of each knife holder 73 is a knife 75, one end of which projects beyond the free end of the knife holder and is formed with teeth, the opposite end of said knife projecting beyond the opposite end of the knife holder so as to overlie a part of knife shaft 64, the arrangement being such that the knife, by engagement with said knife shaft, limits the angular movement of the knife holder 73 under the impetus of springs 74. Normally the knives 75 are disposed at a slight angle to each other, as is most clearly shown in Figure 7, so as more nearly to conform to the transverse curvature of the perimeter of tire 27, and their adjacent margins are spaced somewhat apart from each other as shown to permit any overflow rand at the medial plane of the tire to pass between them, and to permit angular movement of the knife holders as the knife shafts 64 are oscillated.

Figures 7, 8:
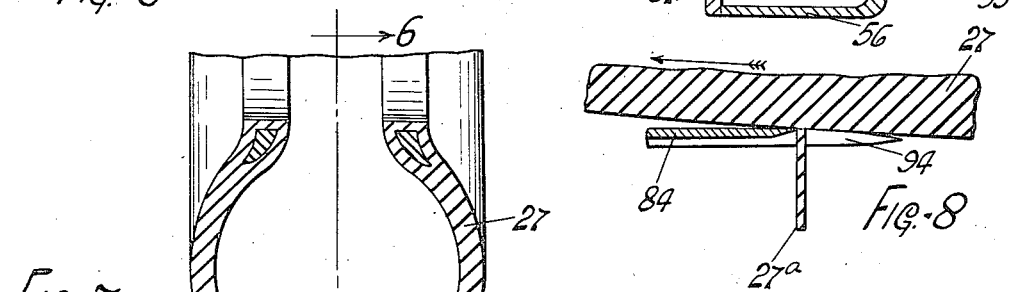
Figure 7 is a section on the line 7—7 of Figure 6.
Figure 8 is a fragmentary sectional view of one of the cutting elements of the apparatus, and the work as it is engaged therewith.
Figure 9:
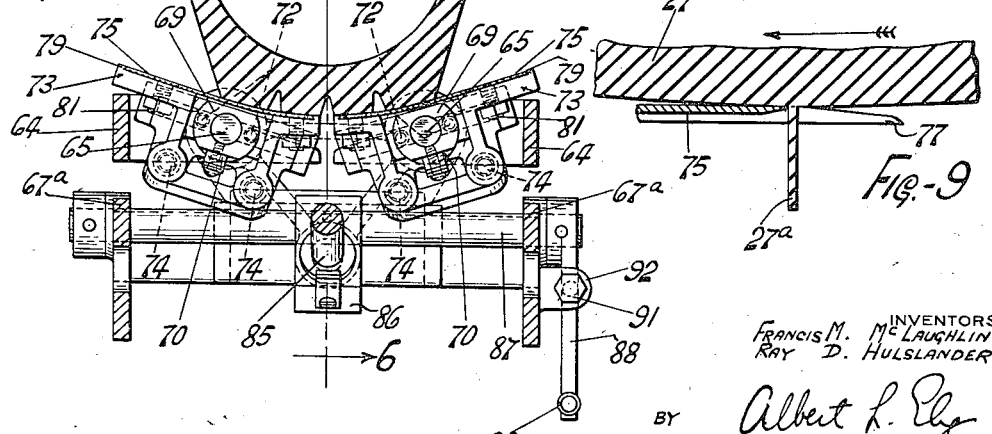
Figure 9 is a section similar to Figure 8 of another cutting element of the apparatus.

The knives 75 are most clearly shown in Figures 12, 13 and 14 wherein it will be seen that the cutting end of each knife is deeply serrated to provide a multiplicity of teeth 77, 77. On the under side of the knife the teeth 77 are beveled on each lateral margin as shown in Figure 14, the beveling extending rearwardly a substantial distance into the body of the knife, the arrangement being such as to provide a thin, sharp, pointed recess between each tooth 77 for the purpose of severing the protuberances 27a from the tire 27 as said protuberances are shown between the teeth 77 by rotation of the tire in the direction indicated by the arrows in several of the figures. The lateral margins of the knives 75 are beveled at 78, 78 so as to engage in complemental undercut flanges 79, 79, Figure 7, formed on the top faces of the knife holders 73, whereby the knives are firmly secured to said holders. It is desirable that the knives 75 be longitudinally adjustable, and to this end each knife is formed with a pair of apertures 80, 80 for receiving the heads of respective bolts 81, 81 that extend through respective slots 82 formed in the knife holders 73. The heads of bolts 81 are slotted and their tops are flush with the upper surface of the knives. Preferably the knives 75 are slightly transversely arcuate as shown in Figures 7 and 14 so as more nearly to conform to the arcuate transverse peripheral contour of the tire 27.

For removing the overflow rand and/or protuberances 27a at the medial plane of the tire 27, a knife 84 is provided, which knife is arranged to engage the tire ahead of knives 75, the longitudinal centerline of knife 84 being in the same plane as medial plane of the tire. The knife 84 is mounted upon the free end of an arm 85 that has its other end secured in a block 86 that is mounted centrally upon a shaft 87 that is journaled at its opposite ends in the bracket structure 67a, adjacent the outer end thereof. One end of shaft 87 projects beyond its bearing and has mounted thereon a lever 88 to the free end of which is connected one end of a tension spring 89, the other end of the latter being connected to stud 90 on said structure 67a. The arrangement is such that the spring 89 normally urges the free end of arm 85, with knife 84 thereon, toward the tire 27, with the cutting end of the knife in position to engage and sever the protuberances on the tire. Angular movement of the arm 85 under the impetus of spring 89 is limited by means of an adjustable stop 91 that is threaded through a lug 92 projecting laterally from bracket structure 67a, said stop 91 being in the same plane as lever 88 so as to be engaged by the latter.

The knife 84, shown in detail in Figures 15, 16 and 17, is very similar to knives 75 except that it is not transversely arcuate, and it is formed with teeth 94, 94 at opposite ends, with the result that the knife may be reversed when dulled at one end. The teeth 94 are beveled on their underside, and the lateral margins of the knife are beveled at 95, 95, Figures 15 and 17, so as to be received in complemental undercut flanges (not shown) formed on the arm 85 for retaining the knife thereon. The knife 84 is formed with an aperture 96 for receiving the head of a bolt 97 that extends through a slot 98 disposed longitudinally in the free end portion of arm 85, the arrangement providing longitudinal adjustability for the knife.

The entire structure on the free end of arm 55 normally is urged upwardly toward the tire 27 by means of a counterweight 100 positioned in the lower part of the apparatus. Said counterweight is mounted upon one arm 101 of a bell crank that is pivotally mounted at its elbow upon a shaft 102 that is supported at its respective ends in suitable bearing brackets 103, 103 on opposite sides of framework 20. The bell crank arm 101 normally is substantially horizontally disposed, and the counterweight 100 is adjustable longitudinally thereof. Said bell crank includes an upwardly extending arm 104 that has a roller 105 journaled at its upper end upon a pin 105a, said roller being positioned in a slot 106 that is formed in the lower end of a lever arm 107 and is disposed longitudinally thereof. At its upper end the lever arm 107 is secured upon one end of the gear housing 47, the arrangement being such that counterweight 100 normally urges the said gear housing to angular movement about its axis, whereby the free end of arm 55 is urged upwardly toward a tire 27 which may be mounted in the machine.

In case it is desired to utilize the machine solely for the washing of tires, the trimming mechanism at the free end of arm 55 may be moved to and retained in a position that is substantially spaced from the orbit of the tire. To this end a latch 110 is pivotally mounted at one of its ends upon a projecting end portion of pin 105a, the free end of said latch being suitably notched as shown so as to engage with a stop or latch block 111 secured to an adjacent portion of framework 20. When said latch is so engaged it is in horizontal position and holds the bell crank and the lever arm 107 in the position shown in Figure 18 whereby the free end of arm 55 is depressed.

Figure 2:
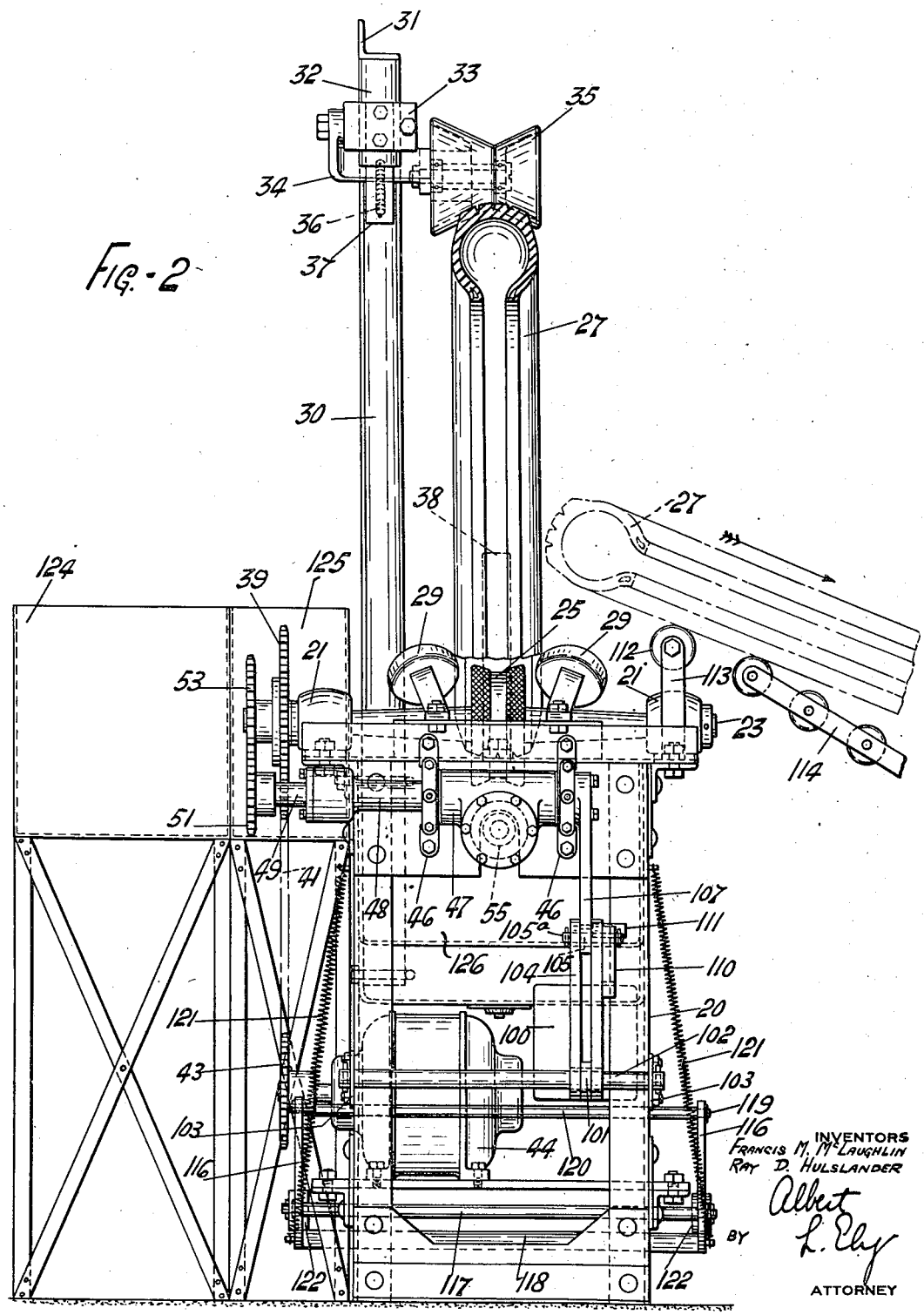
Figure 2 is a side elevation thereof as viewed from the right of Figure 1, and the work therein.

Tires 27 are removed from the machine by toppling them over an elongate roller 112 that extends along the rear side of the machine, said roller being journaled in suitable bearing brackets 113, mounted upon the framework 20. A gravity conveyor 114, Figure 2, having its work-receiving end adjacent roller 112 is provided for receiving the finished work. It is desirable that during the removal of the tire as described, the free end of arm 55 be depressed so that the knives 75 thereon will not trim corners from the tread of the tire as the tire is tilted laterally during the initial stage of its removal. To this end a pedal lever consisting of a pair of arms 116, 116, Figure 2, is pivotally mounted in a central region upon a pivot rod 117 secured at its respective ends in opposite sides of the framework 20. At one end arms 116 are connected by a foot pedal 118 positioned conveniently for the operator at one side of the machine. The other ends of arms 116 are connected by cross-rod 119 upon which is mounted a rotatable sleeve 120, the latter being positioned below and in engagement with the free end of the bell crank arm 101 that carries counterweight 100. The pedal end of arms 116 normally is urged upwardly by a pair of tension springs 121, 121 connected to the respective arms and to fixed points on the framework 20. Stops or abutments 122 are mounted upon the framework 20 in position to limit the upward movement of the pedal 118 under the impetus of springs 121. The arrangement is such that the arms 101 of the bell crank normally rest upon the sleeve 120 when no tire is in the machine, but are lifted clear thereof by the weight of a tire being trimmed, as is shown in Figures 1 and 3, whereby the weight 100 urges the trimming knives 75, 84 on the free end of arm 55 yieldingly into operative engagement with the tire.

As previously stated, the machine may be used for washing tires as well as trimming them, and to this end tanks 124, 125, Figure 2, may be positioned beside the machine for containing cleaning fluid, and sponges, swabs and the like which are used to apply the cleaning fluid to a tire as the latter is rotated in the machine. A receptacle 126 is mounted in framework 20, below the tire 27, for catching cleaning fluid that drips from the tire.

*Operation*

For most efficient operation of the machine, two operators are employed, one standing at the right of the machine as viewed in Figure 1, and one standing at the left thereof. The motor 44 being constantly driven, the operator at the right is required only to place tires 27 in the machine, upon the driving rollers 25, 26, the latter then peripherally driving the tire upon its own axis in the direction indicated by the arrow. The tire in the operative position described bears upon the knives 75, 84 and depresses the free end of the arm 55 sufficiently to lift the bell crank arm 101 off sleeve 120 of the pedal lever structure so that counterweight 100 urges said knives toward the tire. The springs 74 and 89 associated with the respective knives 75, 84 permit yielding movement of the knives relatively of each other in one direction, about axes substantially parallel to the axis of the tire, and the rotation of eccentric 59 causes knives 75 constantly to oscillate about respective axes that are disposed transversely of the axis of the tire. The arrangement is such that protuberances on any region of the peripheral surface of the tire are cleanly and completely severed as the tire makes several revolutions while in the machine.

The operator at the lefthand side of the machine washes the tire therein by applying thereto sponges or swabs soaked in cleaning fluid. As soon as the washing of the tire is complete, this operator steps on pedal 118 to lower the knives on the free end of arm 55 out of engagement with the tire, and then removes the tire from the machine by toppling it off the driving rollers 25, 26, over roller 112 and onto gravity conveyor 114. He then releases pedal 118, which completes the cycle of operation.

Modification may be resorted to without departing from the spirit of the invention or the scope of the appended claims, which are not limited wholly to the specific construction shown and described.

What is claimed is:

1. In a tire trimming machine, the combination of means for supporting a tire, a trimming knife engageable with the said tire, a pivotal support for said trimming knife, and power means for concurrently rotating the tire on its axis and for moving the trimming knife angularly upon its pivot.

2. In a tire trimming machine, the combination of means for supporting a tire and rotating it on its own axis, a trimming knife engageable with said tire, a support for said trimming knife arranged on a pivot, the axis of said pivot being disposed at right angles to the axis of the tire, and means for rocking said knife support on its pivot as the tire is rotated.

3. In a tire trimming machine, the combination of means for supporting a tire and rotating it on its own axis, a trimming knife consisting of a flat blade disposed tangentially of the tire, means for urging said knife yieldingly against the tire, and means for oscillating said knife about an axis that is disposed transversely with relation to the axis of the tire.

4. In a tire trimming machine, the combination of a peripheral support for a tire, means for rotating the tire on its own axis, a trimming knife, a support for said trimming knife arranged on a pivot, the axis of the latter being disposed at right angles to the axis of the tire, means for periodically oscillating said knife support on its pivot, and means for yieldingly urging said trimming knife against the tire.

5. In a tire trimming machine, the combination of a peripheral support for a tire, means for rotating the tire on its own axis, a trimming knife, a support for said trimming knife, a pivot upon which said support is swiveled, means for periodically moving said knife support angularly upon its pivot, and yielding means urging said knife support relatively of said pivot to urge the knife into engagement with the tire.

6. In a tire trimming machine, the combination of means for supporting a tire and rotating it on its own axis, a pivotally mounted arm movable in the plane of the tire, means normally urging the free end of said arm toward the tire, a plurality of tire trimming knives carried at the free end of said arm, and individual pivotal supports for the respective knives on said arm, the axis of at least one of said pivotal supports being disposed at right angles to the axis of another of said pivotal supports.

7. In a tire trimming machine, the combination of means for supporting a tire and rotating it on its own axis, a pivotally mounted arm movable in the plane of the tire, means normally urging the free end of said arm toward the tire, a plurality of tire trimming knives mounted upon the free end of said arm, and yielding means normally urging said knives relatively of said arm toward the tire.

8. In a tire trimming machine, the combination of means for supporting a tire and rotating it on its own axis, a pivotally mounted arm movable in the plane of the tire, and a plurality of tire trimming knives mounted upon the free end of said arm, one of said knives being so positioned as to operate against the middle of the tread portion of said tire and two of the knives being positioned in respective planes disposed at an angle to the plane of the first mentioned knife so as to operate at adjacent regions laterally of said middle region.

9. In a tire trimming machine, the combination of means for supporting a tire and rotating it on its own axis, a pivotally mounted arm movable in the plane of the tire, a plurality of flat tire trimming knives pivotally carried upon the free end of said arm, and means for automatically oscillating at least one of said trimming knives on its pivot determinately with relation to said arm as the tire is rotated.

10. In a tire trimming machine, the combination of means for supporting a tire and rotating it on its own axis, a pivotally mounted arm movable in the plane of the tire, a plurality of flat tire trimming knives mounted upon the free end of said arm in respective planes at an angle to each other, one of said knives being so positioned as to operate against the middle of the tread portion of the tire and two of the knives being positioned to operate at adjacent regions laterally of said middle region, and means for automatically moving the two laterally positioned knives determinately with relation to each other and to the said arm as the tire is rotated.

11. In a tire trimming machine, the combination of means for supporting a tire and rotating it on its own axis, a pivotally mounted arm movable in the plane of the tire, a plurality of tire trimming knives mounted upon the free end of said arm, at least two of said knives being swiveled for angular movement relatively of said arm, means for delivering rotary motion through said arm, means at the free end of said arm for changing said rotary motion to reciprocating motion, and means connecting said last mentioned means to the swiveled trimming knives to rock the same determinately with relation to each other and to said arm.

12. In a tire trimming machine, the combination of means for peripherally supporting a tire, a pivotally mounted arm movable in the plane of the tire, a plurality of tire trimming knives carried at the free end of said arm, at least two of said knives being swiveled for angular movement relatively of the arm, a drive shaft extending through said arm, an eccentric on said shaft at the free end of said arm, means connecting the eccentric to the swiveled knives for moving them angularly with relation to each other and to said arm, and power means for driving said shaft and rotating said tire.

FRANCIS M. McLAUGHLIN.
RAY D. HULSLANDER.